United States Patent Office 3,495,464
Patented Feb. 17, 1970

3,495,464
DEVICE FOR MEASURING LIQUID DENSITY
Vadim Mikhailovich Lebedev, Ulitsa Leningradskaya 140, kv. 63; Boris Mikhailovich Nazarov, Ulitsa Geroev stratosfery 5, kv. 11; Viktor Mitrofanovich Pochinsky, Pereulok Mendeleeva 1, kv. 70; Jury Konstantinovich Smorchkov, Oktyabrsky prospekt 9, kv. 61, all of Voronezh, U.S.S.R.
Filed May 17, 1967, Ser. No. 639,228
Int. Cl. G01n 9/00
U.S. Cl. 73—452
1 Claim

ABSTRACT OF THE DISCLOSURE

A float type device for continuously measuring the density of a liquid by providing a flow chamber through which the liquid passes, a float filled with a standard liquid is positioned in the flow chamber and is mounted on a lever that extends generally horizontally through the side of the flow chamber. A bellows type flexible element sealed to the chamber at one end and the lever at its other end provides free movement of the lever as the float rises when the liquid whose density is being measured increases in density and falls as the liquid becomes less dense. The float comprises an endwise expansible chamber so that the standard liquid in the float being of the same temperature as the liquid in which it is immersed will expand and contact with changes of temperature so that the variations in density of the liquid being measured due to temperatures will not cause errors in the indicated density. The means to introduce the liquid into and remove the liquid from the device are arranged so that the liquid currents will not cause errors in the density readings. The position of the float in the flow chamber is determined by a pneumatic device operating at a low pressure to eliminate the possibilities of errors due to flow of air under pressure.

---

This invention relates to float-type devices for measuring liquid density.

Float-type devices for measuring the density of liquids are known, said devices being based on continuous weighing of a float immersed in a standard liquid, and filled with the liquid whose density is to be measured, the variation of the weight of the float being converted into a signal which indicates the variation of the density of the media being measured. The chamber of the device has the shape of a vessel provided with an external heat-insulating coat and filled with the standard liquid. Inside the chamber, mounted on special branch pipes made in the form of coils, there is a thin-walled float through which the liquid to be measured flows. A variation of the density of liquid being checked causes vertical movement of the float, which is registered by means of a mechanical arrangement (cf. U.S.S.R. Author's Certificate No. 86,279, cl. 421, $I_{03}$).

Disadvantages of the conventionally known device for measuring liquid density are that the readings of such device depend upon the quantity of the liquid flowing through the float which is a result of the hydrodynamic effect at the float inlet and outlet; further, a low accuracy of measurement and unreliable functioning of the device due to friction forces developed in the outlet packing gland and in the mechanical registering arrangement; still further, the known device possesses a great temperature inaccuracy owing to the variation of the modulus of elasticity of the arrangements supplying the liquid to and draining it from the float; further, this device is not suitable for insuring a sufficiently narrow range of density variation, as required for its correct functioning, owing to the development of great forces and to the movement of the float. Moreover, this device can not be used when the liquid being checked is under pressure which causes such stresses in the thin-walled float casing which are above the limit of strength of the material used for the float manufacture, while the increase of the wall thickness of the float would result in the thermodynamic characteristic of the device as a whole being reduced.

An object of the invention is the development of a device for measuring density of liquids, said device possessing high accuracy and sensitivity.

Another object of the invention is the development of a device for measuring the density of liquids suitable for making measurements irrespective of high pressure of the liquid being checked.

The essence of the invention is that in the float-type device for measuring liquid density, wherein a float is disposed in a chamber, the float being movable in the vertical plane, the axis of said float is arranged in a horizontal plane and is filled with standard liquid and mounted on a lever, while the chamber is made as a flow, the liquid under measurement flowing through said chamber in at least two uniform streams flowing towards each other in planes normal to the plane of the float movement, the lever serving as a means of transferring a signal from the float pneumatic device.

It is expedient, in order to produce two uniform flows of liquid acting towards each other in the planes normal to the plane of the float movement, to provide at least two inlet headers and a collecting header located in the flow chamber, said headers distributing the flow of liquid being examined uniformly about the float.

It is desirable that the inlet headers be of a removable circular or ring type, with holes along their peripheries, said holes directing the liquid flow along the float towards the collecting header, located between the inlet headers and provided with holes opposite the holes in the inlet headers.

It is expedient to use a float in the device that is provided with Sylphon bellows on the side faces or ends, said Sylphons being intended for equalizing the pressures in the float and in the chamber.

It is desirable that the lever, carrying float, have a hermetically-sealed connection at its opposite end from the float so that the lever end can actuate a signalling device, said outlet being made, for example, with the use of a flexible Sylphon bellows, a support with an axis of rotation or pivot being arranged parallel to the axis of the float, said support providing for the alignment of the center of the Sylphon effective area with its axis of rotation.

It is expedient that the support of the lever have the shape of two pairs of mutually normal flexible plates, one pair being arranged parallel to the lever axis, two ends of the plates being fastened to a bracket, and the other two to a movable prism connected to the lever, said bracket and lever being movable in relation to the casing of the device and the prism, respectively, when the center of the effective area of the Sylphon is aligned with the axis of rotation of the lever.

The present device may be equipped with a pneumatic converter to convert the outlet signal origniated in the float to an indication on a dial, said converter being connected to the lever carrying the float and containing a linkage, a throttling element of the "nozzle-gate" type and a pneumatic amplifier connected by a negative feedback, the pressure in the nozzle line being lower than the outlet pressure of the pneumatic amplifier and the pressure in the feedback line.

Other objects and advantages of the invention will be apparent from the following description taken in connection with possible embodiments of the invention and the accompanying drawings, in which.

Figure 1:
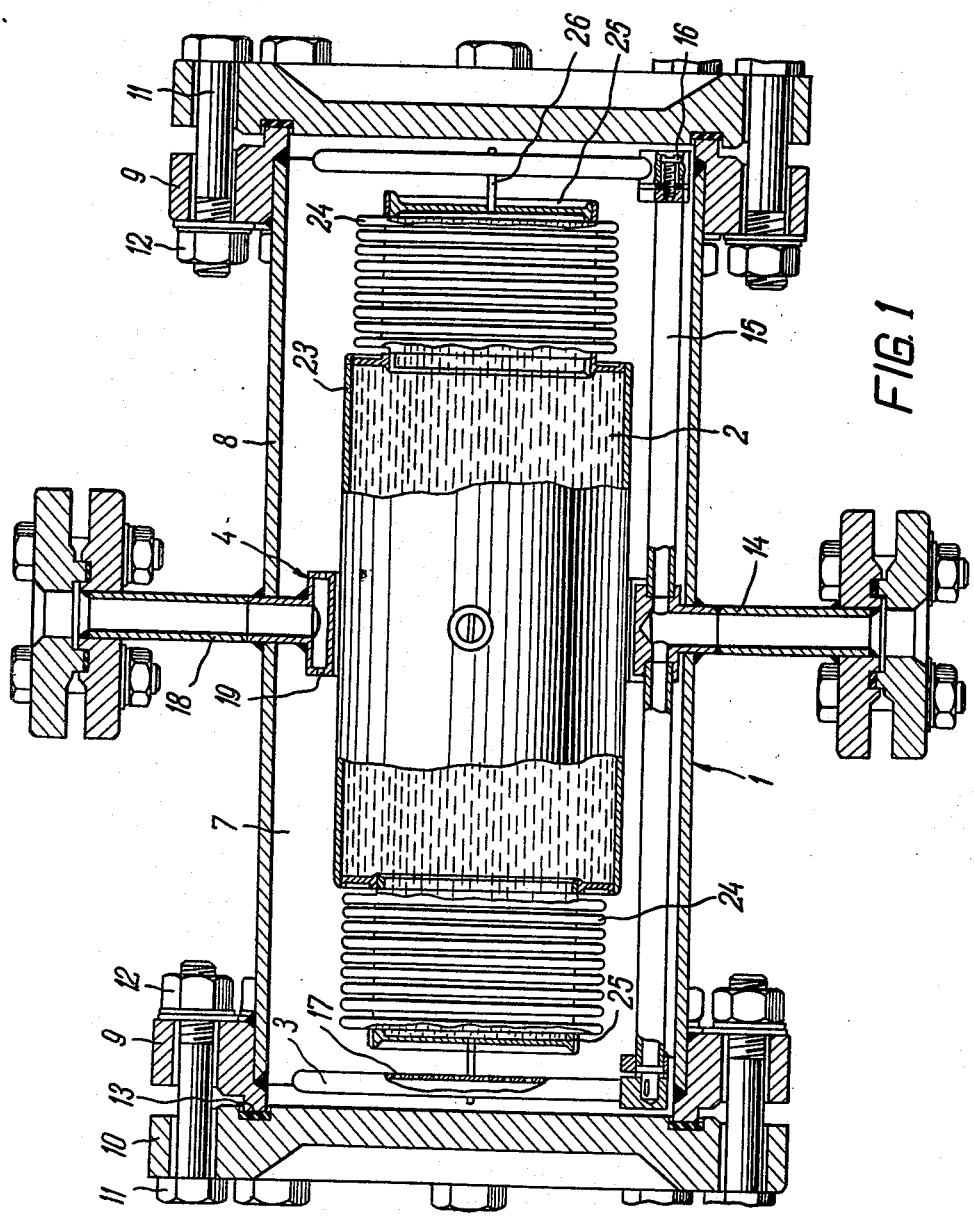
FIGURE 1 is a device for measuring liquid density liquid, according to this invention, shown in partial section along the axis of the float.
Figure 2:
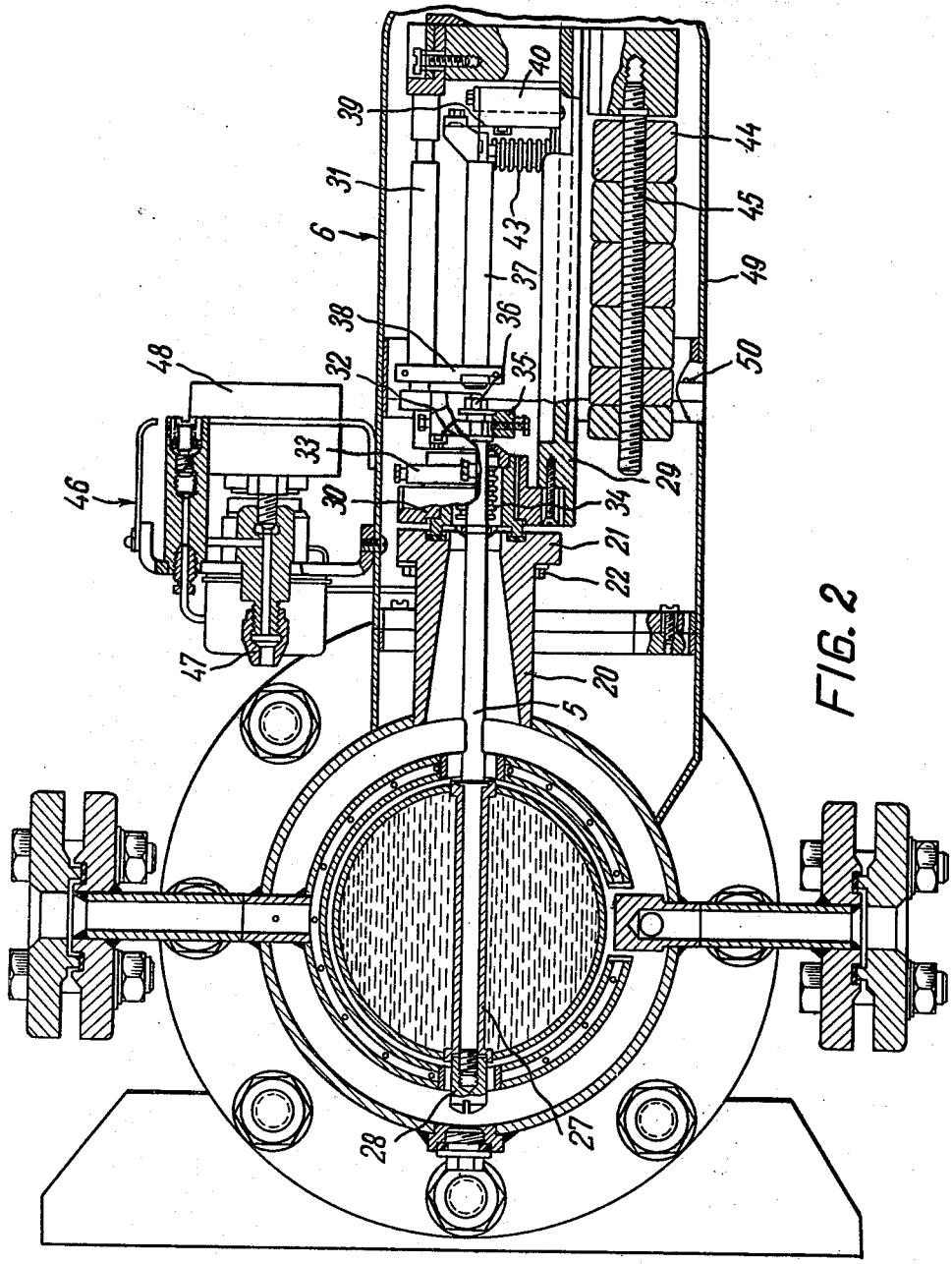
FIGURE 2 is the same device shown in cross-section.

The device for measuring liquid density comprises a casing 1 (FIG. 1) filled with the liquid under examination accommodating a float 2 filled with standard liquid immersed in the liquid under examination. The casing 1 is provided with two inlet headers 3 at the ends of casing 1 and a collecting header 4 at its center also located in the flow of liquid being examined. Liquid flows inside the casing in the direction normal to the plane of movement of the float 2 in two opposite streams uniformly distributed about the float. The float 2, acting through a lever 5, transmits the outlet signal originated at said float to a linkage of the pneumatic converter 6 (FIG. 2).

The casing 1 (FIG. 1) forming a liquid flow chamber 7 has the shape of a shell 8 with two welded flanges 9. The ends of the shell 8 are hermetically sealed by means of blind flanges 10 held to the flanges 9 of the shell 8 by means of bolts 11 and nuts 12. Sealing of the joint is insured by means of gaskets 13. Welded to the lower section of the shell 8 is the inlet union 14 terminating in a horizontal header 15 connected to the circular inlet headers 3 fastened by screws 16 to the ends of said horizontal header. Arranged along the perimeter of the inlet circular headers 3 are drilled holes 17 directed parallel to the float 2. An outlet union 18 extending from the collecting header 4 is welded to the upper portion of the shell 8. Located along the perimeter of said collecting header 4 are oppositely-directed holes 19 facing both sides parallel to the axis of symmetry of the float 2. Welded to the side of the shell 8 is a union 20 (FIG. 2) with a flange 21 to which the pneumatic converter assembly 6 is fastened by bolts 22.

The float 2 is essentially a thin-walled cylinder 23 (FIG. 1) with two Sylphon bellows 24 welded to its ends. Welded to the Sylphon 24 from the opposite side are bottom plates 25 with capillary tubes 26 intended for filling the float with standard liquid. The float 2 is rigidly fixed to the lever 5 by means of a pipe 27 (FIG. 2) welded into the thin-walled cylinder 23, and a special nut 28.

A pneumatic system of force compensation having a small angle of the linkage movement is used as the pneumatic converter 6.

Figure 3:
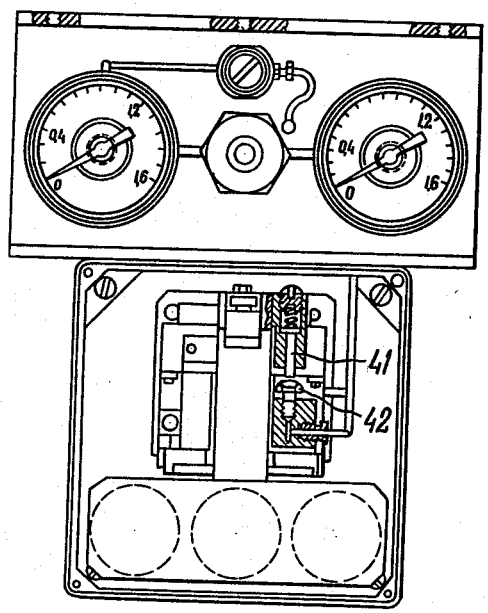
FIGURE 3 is the same device as seen along the arrow A towards the pneumatic converter, with the covers removed.

The pneumatic converter 6 is made as a separate unit installed on a bracket 29 which is fixed to a connecting flange 30. A primary lever 31 is connected by means of flexible plates 32 to a bracket 33 movable along a slot in the flange 30. The bracket 33 is movable in order to eliminate the effect of static pressure, which is achieved by aligning the center of the effective area of a separating Sylphon 34 with the center of rotation of the flexible plates 32 of the linkage. To prevent distortion of the separating Sylphon 34 the lever 5 can be shifted towards a block 35. On completion of adjustment, the lever 5 is fastened in position by means of a nut 36. The primary lever 31 is connected to a secondary lever 37 by means of a slide 38 which is intended for setting a limit of measurement of the device, this being achieved by varying the correlation of the arms of the linkage of the pneumatic converter 6. The secondary lever 37, installed on a flexible support 39 and having a permanent center of rotation, is fastened with the aid of a block 40 to the bracket 29. The end of the primary lever 31 carries a gate 41 (FIG. 3) which governs the air outflow from a nozzle 42.

The feedblock mechanism has the shape of a Sylphon 43 (FIG. 2) soldered to a boss with an air pipe connected to the outlet line of the device. One end of the Sylphon 43 is fixed to the bracket 29, while the other movable end of the Sylphon is connected through an electric terminal to the secondary lever 37. The output signal of the device is set to zero by means of weights 44 which are moved along the thread of studs 45. As a result, the position of the center of gravity of the linkage of the pneumatic converter 6 is adjustable.

A pneumatic amplifier 46 of the pneumatic converter 6 is intended for the amplification of the low-pressure forces obtained in the line of the nozzle 42 (FIG. 3), both as regards their absolute value and power.

The pressure in the line of the nozzle 42 has been reduced with the purpose of reducing the dynamic effect of the air flow upon the gate 41, which results in a smaller angle of pivoting of the linkage of the pneumatic converter 6 (FIG. 2), thus insuring a higher sensitivity for the device.

The working fluid is fed and drawn off by means of nipple connections 47, the pressure being measured by two pressure gauges 48.

The pneumatic converter 6 of the device is closed from the outside by a cover 49 held down by means of screws 50.

The device for measuring liquid density is a stationary automatic pneumatically-operated pick-up of continuous-action type, and is designed for the measurement and adjustment of the density of liquid media under pressure.

The principle of operation of the device is based on the buoyancy of the float 2 immersed in the liquid being examined, the variation of the buoyancy of said float being the linear function of liquid density.

The density of liquid being examined is measured by continuously measuring the buoyancy of the float 2 filled with standard liquid, the variations of the float buoyancy being converted by movement of arm 5 into a pneumatic signal. The forces developed on the float 2, equal to the product of the outside volume of the float 2 multiplied by the instantaneous value of the density of the liquid, is transmitted to the pneumatic converter 6, whose action is based on the principle of compensation. The principle of power compensation is characterized by the absence of major mechanical movements, by virtue of which the device possesses a high sensitivity.

To make sure that the device for measuring liquid density give the readings reduced to one and the same temperature, for example, +20° C., said device is provided with a system of automatic temperature compensation, the float 2 having a variable volume. With this purpose in view, the float 2 is provided with two welded-in Sylphons 24 made of stainless steel. When the density of liquid being examined varies as a result of variation of the temperature of liquid, the Sylphons permit the volume of the float under the changed temperature to vary by varying the volume of the standard liquid contained in the float.

The device for measuring liquid density functions as follows.

The liquid being examined is admitted through the inlet union 14 into the horizontal header 15 where it is divided into two uniform streams.

The inlet headers 3 insure a uniform distribution of liquid by throttling it through the holes 17 arranged along the axis of the float 2. Liquid flowing along the horizontally positioned float 2 is admitted into the collecting header 4 located in the center of the liquid flow chamber 7 of said device.

Comparing the variation of the liquid density owing to the changes in its composition, for example, towards the increase of density, the weight of the float 2 immersed in the liquid will decrease or its buoyancy will increase. The variation of the weight or buoyancy of the float 2 is transmitted to the balanced linkage system of the pneumatic converter 6, resulting in the movement of the gate 41, which has been calibrated by means of the weights 44, in relation to the nozzle 42, in the direction required for closing the gate. As a result, the pneumatic amplifier 46 insures an increase of the outlet pressure, said increase being proportional to the variation of the liquid density. The outlet pressure is fed both into the outlet line of the device and into the Sylphon 43 of the feedback mechanism. In this case, the force developed by the feedback Sylphon 43 compensates for the variation of the weight of the float 2 via the linkage of the pneumatic converter 6. Due to the action of the follow-up system of the "nozzle-gate" type and the response of the feedback mechanism, a strictly definite value of the outlet pressure will correspond to each given density of the liquid being examined. If the liquid density is reduced in chamber 7 the device operates in the contrary sense.

In case the temperature of the liquid varies, its composition remaining without changes, the volume of the float 2 also varies proportionally to the variation of the liquid density caused by the temperature fluctuations. However, the product of multiplication of the volume of the float 2 by the density of the liquid remains a constant value, and the valance of the float 2 is not disturbed. Consequently, temperature fluctuations of the liquid do not cause variation of the outlet pressure of the device.

The employment of the present device permits the development of automatic systems for the control of various production processes, on the basis of the quality of the final product, in the petroleum, chemical, food-manufacturing and other industries, where the employment of the conventionally known devices for measuring liquid density fails to give the desired effect due to poor accuracy and low sensitivity of the known devices. Thus, the device in accordance with this invention will function even when the density of the liquid varies only by 0.01 g./cm.$^3$, at a standard variation of the outlet signal ranging from 0.2 to 1.0 kg./cm.$^2$. Under these conditions, the accuracy of measurement is not less than 0.0001 g./cm.$^3$, the sensitivity of the device being not less than 0.00001 g./cm.$^3$. Moreover, the employment of a float of variable volume, with said float being filled with standard liquid, insures an automatic temperature compensation of the device and, consequently, provides for the calculation of the measured density in terms of a standard temperature, for example, +20° C. The float can therefore be made thin-walled. Control of the flow of the liquid being investigated and its orientation in relation to the plane of movement of the float eliminates the effect of the rate of liquid flow upon the intensity of the outlet signal, and insures a better thermo-dynamic characteristic of the device. The liquid density being measured is determined by movement of the float and transmitted from the chamber, which is under the pressure of liquid, through the separating Sylphon assembly which provides for the alignment of the center of pressure with the axis of rotation of the lever. This arrangement insures the independence of the signal of the device from fluctuating pressures, the pressure of the liquid being varied in a rather wide range.

All the components of the device coming in contact with the liquid being measured may be made of stainless steel which renders the device suitable for use in corrosive media.

When a linkage system insuring a sufficiently wide range of control of the amplification factor is used, the present device can be operated not only at the density variation of 0.01 g./cm.$^3$ or 1.00 g./cm.$^3$, but at any other intermediate density variation values. The reduction of pressure in the nozzle line, as compared with the outlet pressure, insures a higher sensitivity of the device.

While the invention has been described hereinabove with reference to the preferred embodiment thereof, it is to be understood that certain modifications and variations may be made therein, without deviation from the spirit and scope of this invention, which will be readily understood by those skilled in the art.

Said modifications and variations are to be considered as falling within the limits of the spirit and scope of this invention and the appended claim.

We claim:
1. A device for measuring liquid density comprising: a liquid-flow chamber having pipe connections for admitting the stream of liquid being controlled and discharging said stream of liquid; a cylindrically shaped fluid-tight horizontally disposed variable-volume float having Sylphons at its ends, positioned in said chamber and movable in a vertical plane normal to the generatrix of the cylindrical surface; a standard liquid filling said float; means for directing the liquid being controlled into a least two equal and opposed streams in a plane perpendicular to the vertical plane in which said float moves; a pivoted lever carrying said float on one end, said float transmitting the force of buoyancy from the liquid being controlled to said lever; a separating Sylphon adjacent the pivot of said lever, one side of said separating Sylphon being connected to said chamber and the other side to said lever; a source of pneumatic pressure; a pneumatic converter connected to the source of pneumatic pressure and to the end of said lever outwardly of said liquid flow chamber to develop a counteracting force on said lever which operates to keep the device in equilibrium and by which a signal pressure proportional to the density of the liquid being controlled is developed, said means for directing the liquid being controlled into at least two equal and opposite streams in a plane perpendicular to the plane in which said float moves comprising at least two circular inlet headers installed in said liquid flow chamber at the ends of the float, so that the centers of the circular headers coincide with the axis of the float and have openings along their periphery which uniformly distribute the stream of liquid being controlled along the side surface of said float, and a ring-shaped collecting header arranged midway between said inlet headers and having openings arranged at each side along the periphery of the ring directed toward the openings of said inlet headers.

References Cited

UNITED STATES PATENTS 2,459,542   1/1949   Rosenberger _____ 73—452

FOREIGN PATENTS 184,789   4/1923   Great Britain.

RICHARD C. QUEISSER, Primary Examiner

J. K. LUNSFORD, Assistant Examiner